United States Patent
Chmaytelli et al.

(10) Patent No.: US 7,219,145 B2
(45) Date of Patent: May 15, 2007

(54) METHOD AND APPARATUS FOR INDIVIDUALLY ESTIMATING TIME REQUIRED TO DOWNLOAD APPLICATION PROGRAMS TO REMOTE MODULES OVER WIRELESS NETWORK

(75) Inventors: Mazen Chmaytelli, San Diego, CA (US); Paul Jacobs, La Jolla, CA (US); Jason Kenagy, San Diego, CA (US); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 09/871,381

(22) Filed: May 30, 2001

(65) Prior Publication Data

US 2002/0194325 A1    Dec. 19, 2002

(51) Int. Cl.
G06F 15/173    (2006.01)
G06F 15/16    (2006.01)

(52) U.S. Cl. ............ 709/224; 709/203; 709/217; 709/228

(58) Field of Classification Search ............ 709/224, 709/202, 218, 227, 203, 217, 219, 228
See application file for complete search history.

(56) References Cited

U.S. PATENT DOCUMENTS

| | | | | |
|---|---|---|---|---|
| 5,724,514 A | * | 3/1998 | Arias | 709/235 |
| 5,908,467 A | * | 6/1999 | Barrett et al. | 709/218 |
| 5,968,132 A | * | 10/1999 | Tokunaga et al. | 709/247 |
| 6,006,260 A | * | 12/1999 | Barrick et al. | 709/224 |
| 6,223,221 B1 | * | 4/2001 | Kunz | 709/224 |
| 6,278,449 B1 | * | 8/2001 | Sugiarto et al. | 345/826 |
| 6,304,909 B1 | * | 10/2001 | Mullaly et al. | 709/232 |
| 6,313,855 B1 | * | 11/2001 | Shuping et al. | 715/854 |
| 6,363,477 B1 | * | 3/2002 | Fletcher et al. | 713/151 |
| 6,405,240 B1 | * | 6/2002 | Tsubone et al. | 709/203 |
| 6,668,159 B1 | * | 12/2003 | Olofsson et al. | 455/226.1 |
| 6,738,804 B1 | * | 5/2004 | Lo | 709/219 |
| 6,741,565 B1 | * | 5/2004 | Wicklund | 370/234 |
| 6,757,543 B2 | * | 6/2004 | Moran et al. | 455/456.1 |
| 6,832,239 B1 | * | 12/2004 | Kraft et al. | 709/203 |
| 6,862,102 B1 | * | 3/2005 | Meisner et al. | 358/1.15 |
| 6,928,468 B2 | * | 8/2005 | Leermakers | 709/221 |

FOREIGN PATENT DOCUMENTS

| | | | |
|---|---|---|---|
| EP | 0992922 | | 9/1999 |
| JP | 2002189598 A | * | 7/2002 |
| WO | WO0127800 | | 10/2000 |
| WO | WO0131846 | | 10/2000 |

* cited by examiner

Primary Examiner—Bharat Barot
Assistant Examiner—David Lazaro
(74) Attorney, Agent, or Firm—Robert J. O'Connell; Fariba Yadegar-Bandari

(57) ABSTRACT

Estimation of user-specific length of time required to download application program over-the-air onto a remote module, such as a wireless device, is calculated based on data transfer rates for data files sent over network to wireless device preceding a requested download of application program. Data transfer rates are calculated while user of wireless device browses application programs for download and/or purchase. Wireless device utilizes data transfer rates and information representing size of selected application program to estimate length of time required to download application program onto the wireless device and displays estimate to user.

22 Claims, 5 Drawing Sheets

FIGURE 5a DATA TRANSFER RATE CALCULATIONS

| | DATA FILE | SIZE OF DATA FILE | TIME REQUIRED TO DOWNLOAD | DATA RATE (SIZE ÷ TIME) |
|---|---|---|---|---|
| 502 | LIST OF APPLICATIONS | 8.4 Mb | 4 SECONDS | 2.1 (DTR(A)) |
| 504 | DESCRIPTION OF SELECTED APPLICATION | 14.4 Mb | 8 SECONDS | 1.8 (DTR(B)) |
| 506 | DEMO | 180 Mb | 120 SECONDS | 1.5 (DTR(C)) |

TIME ⟶

FIGURE 5b ESTIMATE OF TIME TO DOWNLOAD SELECTED APPLICATION PROGRAM

| | AVERAGING METHOD | DATA RATES USED | AVERAGE DATA RATE | SIZE OF SELECTED APPLICATION | TIME ESTIMATE (SIZE ÷ AVERAGE DR) |
|---|---|---|---|---|---|
| 508 | AVERAGE | DTR (A) - (C) | 1.8 | 500 Mb | 4.6 MINUTES |
| 510 | WEIGHTED | DTR (A) - (C) WITH DTR(C) WEIGHTED | 1.7 | 500 Mb | 4.9 MINUTES |
| 512 | MOVING | DTR (B) - (C) | 1.65 | 500 Mb | 5.1 MINUTES |
| 514 | MOVING WEIGHTED | DTR (B) - (C) WITH DTR(C) WEIGHTED | 1.6 | 500 Mb | 5.2 MINUTES |

METHOD AND APPARATUS FOR INDIVIDUALLY ESTIMATING TIME REQUIRED TO DOWNLOAD APPLICATION PROGRAMS TO REMOTE MODULES OVER WIRELESS NETWORK

BACKGROUND OF THE INVENTION

1. Field of the Invention

This invention relates to the downloading of application programs over a wireless network. More particularly, the invention concerns the individual estimating and display of a length of time to download an application program over a wireless network to a remote module, such as a wireless device, based on calculated data transfer rates.

2. Description of the Related Art

Wireless technology is rapidly evolving and is playing an increasing role in the lives of people throughout the world. Ever-larger numbers of people are relying on this technology directly or indirectly. Wireless technology involves telecommunications in which electromagnetic waves (rather than some form of wire) carry signals over part or all of a communication path. Wireless devices constitute a visible implementation of wireless technology.

Today's wireless devices contain special circuits, such as application-specific integrated circuits ("ASICs"), capable of running a variety of application programs including some that would otherwise run on computers. These application programs include games, books, and information content programs (such as news information, stock quotes, up-to-date weather information, or air flight times and information). These applications may be downloaded onto the wireless devices at the time they are manufactured or later over-the-air using electromagnetic waves.

With the anticipated proliferation of the downloading of programs over-the-air, it will be increasingly important for a user of a wireless device to know how much time is required to download the programs. For example, if the user pays per minute of air-time, the user will want to know how long the download will take, so that the user will have some idea of how much the download will cost (in addition to the cost of the application program, if a charge is associated with the download itself).

However, the length of time required to download application programs over-the-air is extremely variable. The data transfer rate (the rate at which data is transferred wirelessly to a wireless device) changes, in part, due to the inherently dynamic nature of signal-to-noise ratios. In analog and digital communications, the signal-to-noise ratio ("S/N") is a measure of signal strength relative to background noise. "Noise" is unwanted electrical or electromagnetic energy that degrades the quality of signals and data. Noise can affect any communications regardless of content, such as text, programs, images, audio, and telemetry. The higher the SIN ratio, the faster the wireless device will be able to download an application program.

One reason for changes in S/N ratio is that wireless devices are mobile, leaving the S/N ratio subject to change because the user of the wireless device is moving (such as in a vehicle) either away from a signal, into a tunnel where the signal cannot reach, or in some other manner adversely affecting the S/N ratio.

In addition to the mobile nature of wireless devices, another factor that influences S/N ratio (and thus data transfer rates) is the communications mode of the wireless device. For example, wireless devices utilizing cdmaOne technology, developed by QUALCOMM Incorporated, are capable of achieving a maximum data transfer rate of up to 14.4 kilobits per second. Telephones utilizing the next generation of wireless devices (3G), such as those using CDMA2000 technology, developed by QUALCOMM Incorporated, will be capable of achieving data transfer rates of 115 kilobits per second. Other new products, such as those using the 1×EV technology, developed by QUALCOMM Incorporated, have data transfer rates of 2.4 megabits per second.

Still another factor that influences S/N ratio is electromagnetic interference. Any device or system that generates an electromagnetic field in the radio frequency spectrum may potentially disrupt the operation of wireless devices. Wireless transmitters (such as radio or television transmitters) can produce electromagnetic fields strong enough to severely affect the S/N ratio. For example, although the maximum data transfer rate for cdmaOne technology is 14.4 kilobits per second, due to interfering electromagnetic energy and an uncontrollable radio frequency environment, the average actual data transfer rate for the cdmaOne technology is 9.6 kilobits per second.

For these reasons, it is impossible to determine, in advance, the data transfer rate for wireless devices, as data transfer rates are greatly affected by the mobile nature of wireless devices, the communications mode of the telephone, and electromagnetic interference. Consequently, it would be extremely difficult to provide an accurate estimate, in advance, of the length of time required to download an application program over-the-air onto a wireless device.

In addressing the foregoing concerns, one approach might be to look at download estimates displayed by personal computers. However, computer estimates for the length of time to download application programs have traditionally been calculated based on the size of the application program and the modem speed, both of which are constant numbers. In addition, download estimates for computer programs over the internet are often inaccurate. The computer has no information about the data transfer rates between various outside components of the internet (for example, other outside servers) that may affect the downloading time for a particular program. Thus, in download estimates for computer programs, there is no examination of the data transfer rates immediately preceding a download that might significantly affect the estimate.

As discussed above, the data transfer rates for wireless devices are not constant and vary depending on different factors affecting the S/N ratio. Consequently, certain unsolved problems are to be expected in future attempts to estimate download times of application programs onto wireless devices.

SUMMARY OF THE INVENTION

Broadly, the systems and methods consistent with the present invention concern the individual estimation and display of a length of time to download an application program over a wireless network to a remote module, such as a wireless device, based on calculated data transfer rates.

Initially, a user operates a wireless device to initiate a data connection with a server over a wireless network. The user then operates the wireless device to request one or more data files from the server. The data files contain information regarding one or more application programs available for potential download to the wireless device.

The server sends the one or more data files through the network for broadcasting to the wireless device. Upon completion of the receipt of each of the data files by the wireless device, the wireless device calculates the data transfer rate for that particular data file under the then-existing S/N ratio conditions for the wireless device.

In response to a user operating the wireless device to select one or more application programs for download, the wireless device utilizes the calculated data transfer rates and information representing a size of the selected application program to estimate the length of time required to download the selected application program onto the wireless device. The wireless device displays the estimate to the user.

The wireless device may be configured to estimate the length of time to download the application program in various manners. For example, the calculated data transfer rates may be averaged, or weighted closer in time to the wireless device being operated to request that a particular application program be downloaded. Alternatively, the estimation may be based on data transfer rates calculated during a set period of time prior to the download request, or weighted closer in time to the download within a set period of time prior to the download.

In an alternative embodiment, the server estimates the length of time to download the application program under then-existing S/N ratio conditions. In this embodiment, the server calculates the data transfer rates by tracking the length of time between the server sending each data file to the wireless device, and the wireless device notifying the server of the completed download of that data file. The server then uses the size of the selected application program and the calculated data transfer rates to estimate the length of time to download the selected application program. The server communicates the estimate to the wireless device for display to the user.

The invention affords a number of distinct advantages. Chiefly, the invention provides a user of a wireless device with an estimate of time for download that is user-specific and based on the precise conditions and S/N ratio immediately preceding the download. As a result, the estimate empowers the user of the wireless device to make informed and better decisions about whether or not the user desires to proceed with a particular download. For example, if a user pays for each minute of air-time for the wireless device, upon receiving a display of an estimate of time for download, the user may not want to pay for the time required to download a large application program. As another example, if the wireless device is being operated under conditions adverse to the S/N ratio, a user may choose to wait to download an application program until the conditions are more favorable (and the corresponding estimate for the length of time to download the application program is shorter).

The invention also provides a number of other advantages and benefits, which will be apparent from the following description of the invention.

DESCRIPTION OF PREFERRED EMBODIMENT

The nature, objectives, and advantages of the invention will become more apparent to those skilled in the art after considering the following detailed description in connection with the accompanying drawings. As mentioned above, the invention concerns the individual estimating and display of a length of time to download an application program over a wireless network to a remote module, such as a wireless device, based on calculated data transfer rates. While the foregoing description describes a wireless environment, it will be recognized by those skilled in the art that the present invention is not limited to the wireless environment and may be used in other environments, including non-wireless environments, to estimate and display the time, or other measurement parameter, to download an application.

Hardware Components & Interconnections

Wireless Device

Figure 1:
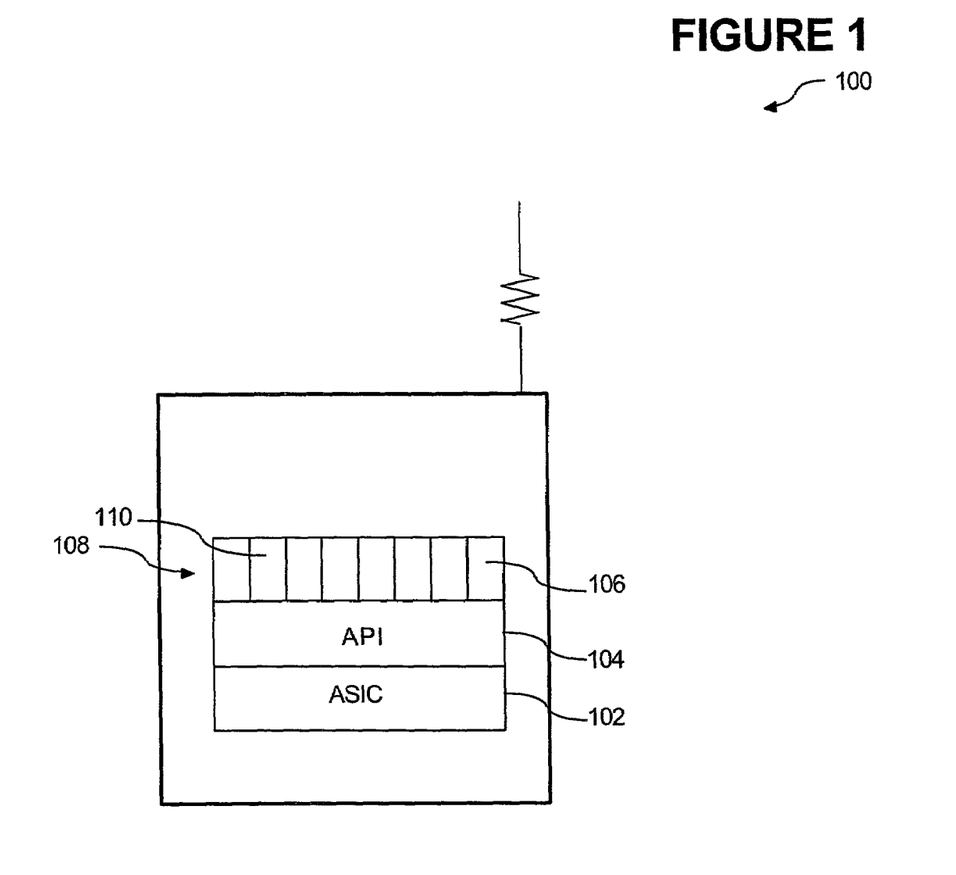
FIG. 1 is a block diagram of the hardware components and interconnections of a wireless device including a data transfer rate program resident thereon in accordance with an exemplary embodiment of the present invention.

Referring to FIG. 1, the invention is illustrated in the context of a wireless device 100. The wireless device 100 is used as an example without any intended limitation. The invention may alternatively be performed on any form of remote module capable of communicating though a wireless network, including without limitation, personal digital assistants ("PDAs"), wireless modems, PCMCIA cards, access terminals, personal computers, access terminals, telephones without a display or keypad, or any combination or sub-combination thereof. These examples of remote modules also may have a user interface, such as a keypad, visual display or sound display.

The exemplary wireless device 100 shown in FIG. 1 includes an ASIC 102 installed at the time the wireless device 100 is manufactured. An ASIC 102 is a microchip designed for a special application, in this case, wireless devices 100. The ASIC 102 is a hardware component that is driven by software included in the ASIC 102. An application programming interface ("API") 104 also is installed in the wireless device 100 at the time of manufacture. The API 104 is a software program that runs on the ASIC 102 and is configured to interact with the ASIC 102.

The API 104 serves as an interface between the ASIC 102 hardware and various programs stored on the wireless device 100, discussed below. The API 104 and programs are compatible.

The wireless device 100 includes storage 108. The storage 108 comprises RAM and ROM, but alternatively may be any form of memory such as EPROM, EEPROM or flash card inserts. Within the storage 108, one or more application programs 110 may be downloaded or stored in the wireless device 100. The application programs 110 comprise programs that are compatible with the API 104 and are run on the wireless device 100. The programs 110 include, without limitation, games, books, and information content programs. The storage 108 may also include a data transfer rate program 106 that is downloaded onto the wireless device 100 at the time of manufacture. The data transfer rate program 106 receives application programs and use supplemental information to calculate data transfer rates. The data transfer rate program 106 measures the length of time for the wireless device 100 to download data files 208 (discussed in FIG. 2) sent from servers 204 within a network 200 to the wireless device 100. The data transfer rate program 106 tracks (measures) the length of time from when the first bit of data from a data file 208 reaches the wireless device 100, to when the last bit of data for that data file 208 reaches the wireless device 100.

Network

Figure 2:
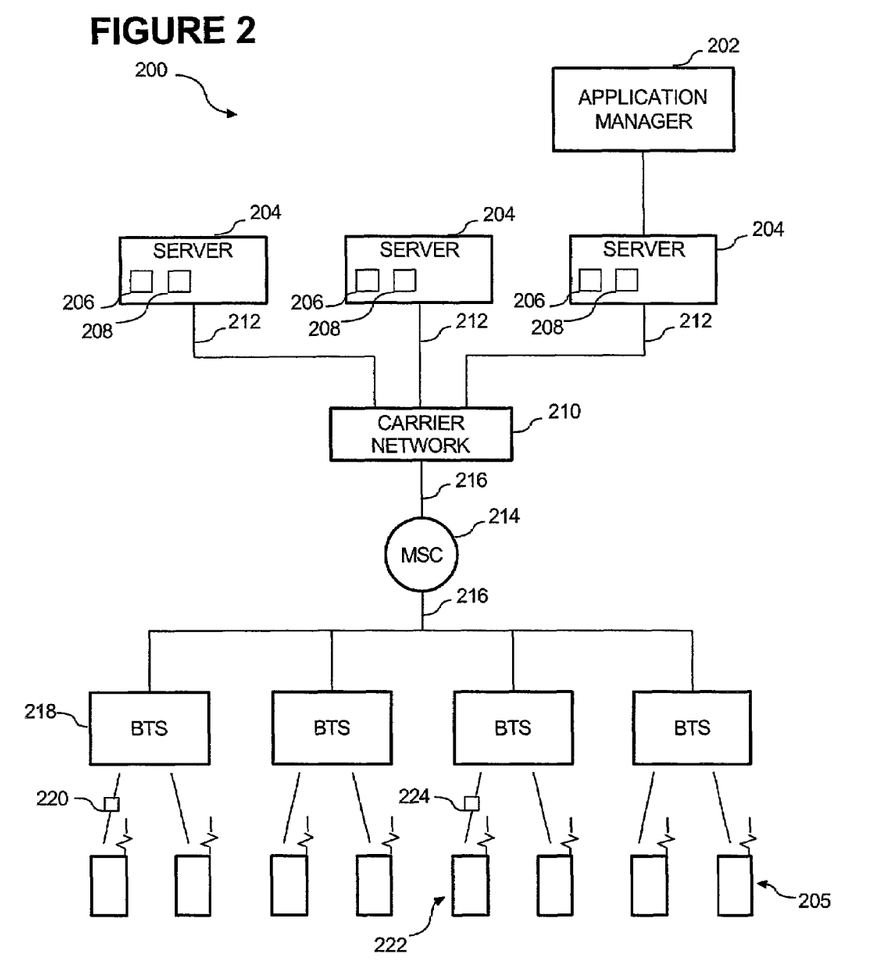
FIG. 2 is a block diagram of the hardware components of an exemplary wireless network providing communication between different components, including servers and wireless devices, in accordance with an exemplary embodiment of the present invention.

FIG. 2 illustrates an example of a network 200 over which a wireless device 222 estimates a length of time to download application programs 206 stored on servers 204. The network 200 includes various components linked in different manners. The network 200 described below is exemplary, only. For purposes of the present invention, the network 200 includes any system whereby remote modules, such as wireless devices 205, communicate over-the-air between and among each other and/or between and among other components of a network, including, without limitation, wireless network carriers and/or servers.

At one end of the network 200 is an application manager 202. The application manager 202 is a company that develops and provides application programs 206 for downloading to wireless devices 205. Alternatively, the application manager 202 may be one or more persons, corporations, computers, servers or any other entity or network 200 component. The application manager 202 sends the application programs 206 to one or more servers 204 in the network 200, where the application programs 206 are stored. The application manager 202 may store the application programs 206 on one or multiple servers 204. Other companies (not shown) also may store application programs 206 on the servers 204. The application programs 206 are stored on the servers 204 because the wireless devices 205 in the network 200 are configured to communicate with the servers 204.

Another type of information stored on the servers 204 is data files 208. The data files 208 comprise metadata about the application programs 206 stored on the servers 204. The data files 208 are any files that describe the application programs 206 that may be downloaded onto the wireless devices 205. The application manager 202 develops and prepares the data files 208 and sends them to the servers 204 where they are stored. Alternatively, the data files 208 may be developed and/or stored by any other person, entity or component of the network 200.

The data files 208 are designed to allow users of the wireless devices 205 to browse the different application programs 206 available on the servers 204 for possible selection of one or more application programs 206 to download onto the wireless devices 205. The data files 208 include descriptive information regarding the application programs 206, such as a list of the application programs 206 available, their cost, their size, a description of their content, and/or a short demonstration ("demo") for a test-run of how the application program 206 performs.

The data files 208 are further programmed to include a description of the size, for example, number of bytes of the data file 208. The size information is used by the wireless device 222 to calculate data transfer rates, as discussed below.

The servers 204 storing the various application programs 206 and data files 208 communicate with a carrier network 210 via a network connection over the Internet 212. The carrier network 210 controls messages sent to a messaging service controller ("MSC") 214. The carrier network 210 communicates with the MSC 214 by both the internet and POTS (plain ordinary telephone system), collectively identified in FIG. 2 as 216. The Internet 216 portion of the connection between the carrier network 210 and the MSC 214 transfers data, and the POTS 216 portion of the connection transfers voice information. The MSC 214, in turn, is linked to multiple base stations ("BTS") 218. The MSC 214 is connected to the BTS 218 by both the internet 216 (for data transfer) and POTS 216 (for voice information). The BTS 218 broadcast messages wirelessly to the telephones 205 by any over-the-air method.

The estimation of the length of time to download an application program 206 to the wireless devices 205 is calculated based on communications between the servers 204 and the wireless devices 205. These communications pass back and forth through the carrier network 210, the MSC 216, and the BTS 218.

For purposes of the present invention, a wireless device 222 (one or more of the many wireless devices 205 that are part of the overall network 200) is operated by a user to initiate a data request 224. Without any intended limitation, the illustrated data request 224 comprises an short messaging service (SMS) item 220, or any over-the-air message. The data request 224 reaches the BTS 218 and is sent by the BTS 218 to the MSC 214, to the carrier network 210 and on to a server 204. A server 204 interprets the data request 224 and provides any requested data file 208 by sending the data file 208 to the wireless device 222 through the network 200 (i.e., by sending the data file 208 to the BTS 218 for broadcasting to the wireless device 222 over-the-air.)

The wireless device 222 may be operated to perform a series of data requests 224. This series of data requests 224 may be performed as a result of a user of the wireless device 222 browsing the application programs 206 stored on the servers 204 for potential download. In response to each data request 224 sent by the wireless device 222, the server 204 sends the wireless device 222 one or more data files 208 (containing metadata about the application programs 206).

As discussed below, in one embodiment these communications form the basis for the wireless device 222 (which contains a data transfer rate program 106) to calculate data transfer rates specific to the wireless device 222 and the corresponding estimate of time to download a selected application program 206, should the user of the wireless device 222 so desire.

Operation

In addition to the various hardware embodiments described above, a different aspect of the invention concerns a method for the individual estimating and display of a length of time to download an application program 206 over a wireless network 200 to a remote module, such as a wireless device 222, based on calculated data transfer rates.

Operation of Wireless Device

Figure 3:
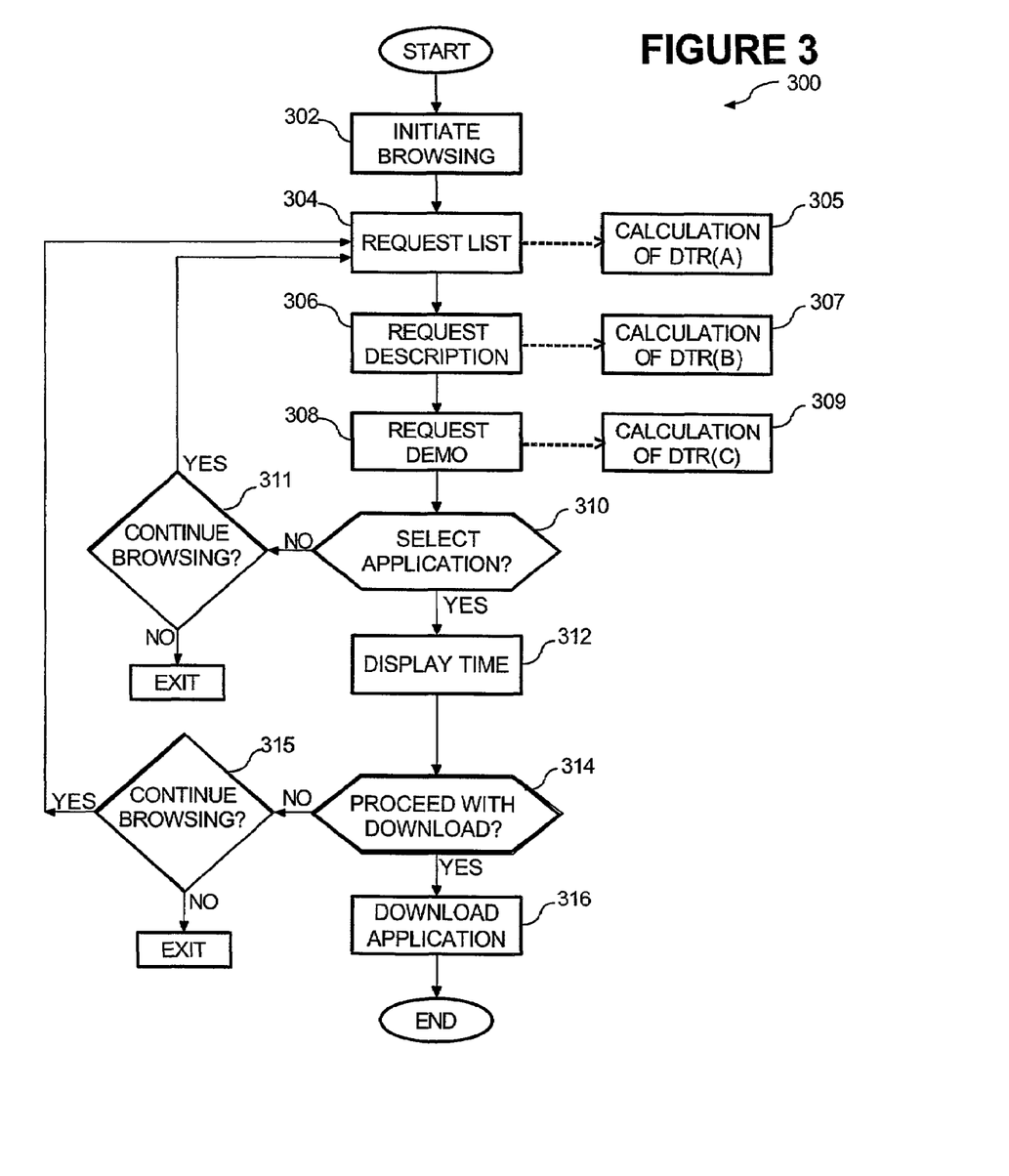
FIG. 3 is a flowchart of an operational sequence performed by a wireless device for the overall process of downloading an application program and calculating various data transfer rates in accordance with an exemplary embodiment of the present invention.

FIG. 3 shows an overall sequence 300 to illustrate the operation of a wireless device 222 downloading an application program over-the-air and calculating several data transfer rates. For ease of explanation, but without any limitation intended thereby, the example of FIG. 3 is described in the context of the hardware environment described above. While FIG. 3 illustrates three examples of data transfer rate calculations, only one data transfer rate calculation is necessary before the wireless device 222 may proceed with estimating a length of time to download one of the application programs 206. Conversely, the wireless device 222 may calculate many more than three data transfer rates over time. Alternatively, the servers 204 or other parts of the network 200, including without limitation, the application manager 202 or the carrier network 210, may calculate the data transfer rates, as opposed to or in conjunction with the wireless device 222. An alternative embodiment, wherein one of the servers 204 calculates the data transfer rates, is discussed below. In addition, both the wireless devices 205 and other portion(s) of the network 200 may calculate data transfer rates simultaneously or in tandem.

The sequence in FIG. 3 commences with step 302, in which the wireless device 222 is operated to browse application programs 206 stored on the servers 204 for potential download. The purpose for browsing applications 206 may be to purchase an application 206 for download, or to download an application 206 at no-cost. The browsing starts when the wireless device 222 is operated to send a data request 224 through components of the network 200 to a server 204. The data request 224 may be initiated by the operation of a download manager and/or mini-browser function on the wireless device 222.

In step 304, the data request 224 reaches one of the servers 204. In response, the server 204 sends an initial data file 208 to the wireless device 222. The server 204 sends the initial data file 208 through components of the network 200 such that it is broadcast through the BTS 218 directed to the wireless device 222.

In step 304, the wireless device 222, upon receipt of the data file 208, displays the data file 208 to a user of the telephone 222. For exemplary purposes only, the initial data file 208 contains a list of the names of all application programs 206 for the user to choose from.

In step 305, the wireless device 222 calculates a corresponding data transfer rate ("DTR (A)") for the data file 208 that it received from the server 204. DTR(A) represents the speed at which the data file 208 containing the list of application programs 206 streamed over-the-air from the BTS 218 to the wireless device 222 given the existing S/N ratio conditions for the wireless device 222. The data rate program 106 on the wireless device 222 divides the size of the data file 208 by the time required to download the data file 208 to calculate DTR(A). The wireless device 222 obtains the size of the data file 208 from the data file 208 itself (as previously discussed, each data file 208 is programmed to contain information representing the size of the data file 208).

Figure 5A:
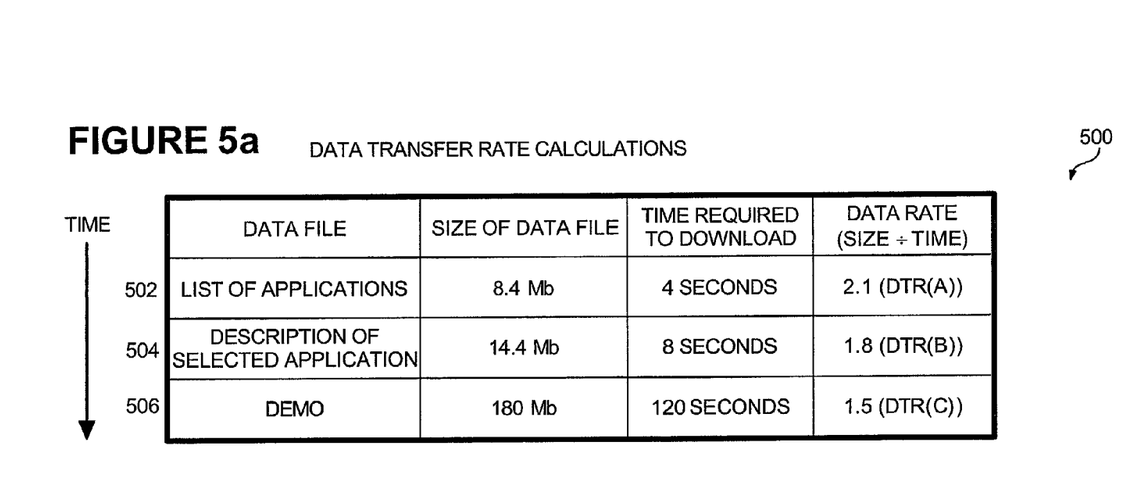
FIG. 5a shows a table of exemplary data transfer rate calculations by the wireless device for a series of data files sent from a server to the wireless device in accordance with an exemplary embodiment of the present invention.

FIG. 5(a) contains a table illustrating the calculation of the data transfer rates by the wireless device 222 using exemplary characteristics for the data files 208. DTR(A) is calculated in Row 502 of FIG. 5(a). The initial data file 208 contains the list of application programs 206. The size of that data file 208 is 8.4 Megabits and the time required to download that data file 208 is 4 seconds. The data transfer rate program 106 on the wireless device 222 divides the size of the data file 208 (8.4 Megabits) by the time required to download the data file 208 (4 seconds) to calculate DTR(A), which is 2.1 Megabits/second.

Referring back to FIG. 3, in step 306 (optional), the wireless device 222 is operated by a user to send a second data request 224 to obtain a second data file 208 from a server 204. For exemplary purposes only, the second data file 208 contains a description of one of the application programs 206 available for download. The description may contain promotional material about the content of the application program 206, the price of the application program 206, its uses and/or benefits, and any other information helpful to the user in determining whether the application program 206 should be downloaded onto the wireless device 222. In step 307, the wireless device 222 calculates a second data transfer rate ("DTR(B)") corresponding to the speed at which the second data file 208 streamed over-the-air from the BTS 218 to the wireless device 222.

FIG. 5(a), Row 504 illustrates the calculation of this second data transfer rate by the wireless device 222. The second data file 208 contains a description of the selected application program 206; the size of that data file 208 is 14.4 Megabits; and, the time required to download that data file 208 was 8 seconds. The data transfer rate program 106 on the wireless device 222 divides the size of the data file 208 (14.4 Megabits) by the time required to download the data file 208 (8 seconds) to calculate DTR(B), that is 1.8 Megabits/second. In step 308, the wireless device 222 and the server 204 exchange a third data request 224 and corresponding data file 208. In step 308, the wireless device 222 is operated to send a data request 224 to obtain a demonstration ("demo") for one of the application programs 206. Upon receipt of the data request 224, the server 204 sends the data file 208 containing the demo through components of the network 200 for broadcasting to the wireless device 222. The demo 308 contains a limited portion of one of the application programs 206, such as a sample portion of an educational program for preschoolers, to run on the wireless device 222 so that the user may determine whether the user desires to download the entire application program 206.

In step 309, the wireless device 222 calculates a third data transfer rate ("DTR(C)"). DTR(C) corresponds to the speed at which the data file 208 containing the demo streamed over-the-air from the BTS 218 to the wireless device 222.

FIG. 5(a), Row 506 illustrates the calculation of DTR(C) by the wireless device 222. The data file 208 contains a demo for an application program 206; the size of that data file 208 is 180 Megabits; and, the time required to download that data file 208 is 120 seconds. The data transfer rate program 106 on the wireless device 222 divides the size of the data file 208 (180 Megabits) by the time required to download the data file 208 (120 seconds) to calculate DTR(C), which is 1.5 Megabits/second.

Referring back to FIG. 3, in step 308, for exemplary purposes, the browsing functions are completed, and the wireless device 222 is no longer operated to send data requests 224 or receive data files 208 from the servers 204.

While the above-described three data transfer rates were calculated based on the contents of three specific data files, it will be recognized by those skilled in the art that the data transfer rates may be calculated using any type of data and any number of individual transfers.

In step 310, the wireless device 222 is operated to notify one of the servers 204 whether one or more of the application programs 206 is selected for download. In step 311, if no application program 206 is selected, the wireless device 222 may be operated to continue browsing other application programs 206 by, for example, returning to step 304. There are various reasons why the wireless device 222 may be operated to renew the browsing functions. For example, a user may decide not to purchase a particular application program 206 after browsing its contents because the user was not interested in, or did not like, the application program 206. Conversely, the wireless device 222 may no longer be operated to browse applications 206, in which case the wireless device 222 is operated to exit the browsing functions.

If, in step 310, the wireless device 222 is operated to select an application for download, the sequence moves to step 312. In step 312, the wireless device 222 displays to a user an estimated time required to download the one or more selected application programs 206. The method performed by the wireless device 222 to estimate this length of time is discussed below in connection with FIG. 4. The time display in step 312 may be represented with a set numerical estimate (such as in minutes or seconds), graphically displayed with a bar graph, an hour-glass or any other visual element, and/or using sound.

In step 314, the wireless device 222 displays a choice for whether the user desires to continue with the download given the estimate of time to download the selected application program 206 displayed to the user. There are various factors for why a user may, or may not, want to proceed with a download after receiving the estimate of time for the download. For example, if the user of the wireless device 222 pays money for the air-time required to download the selected application program 206, and if the air time required is excessive, in the user's view, the user may not desire to proceed with the download. If, on the other hand, the length of time to download the selected application program 206 seems reasonable to the user, in light of the cost to the user for that length of air time, the user may choose to proceed with the download. As another example, the user of the wireless device 222 may be entering a meeting or be otherwise occupied such that the user does not have enough time to complete the download as desired.

In step 315, if the wireless device 222 is operated to not proceed with the download, the wireless device 222 may be operated to continue browsing other application programs 206 (by, for example, returning to step 304). If further browsing is not desired, the wireless device 222 is operated to exit the browsing function.

If the wireless device 222 is operated to notify the server 204 to proceed with downloading a selected application program 206, the sequence moves to step 316. In step 316, in response to receiving a request for download from the wireless device 222, the server 204 sends the application program 206 over the network 200 for broadcasting directed to the wireless device 222. The wireless device 222 receives the application program 206 and stores the application program 206 in its storage 108. Optionally, the wireless device 222 automatically displays to the user an application program 206 download progress gauge, showing the user how much time remains to download the selected application program 206 as it is being downloaded. This display may be, without limitation, a numerical or visual estimate.

Sequence 300 ends following the completed download of the application program 206 onto the storage 108 of the wireless device 222.

Estimation Of Length Of Time To Download Selected Application Program

Figure 4:
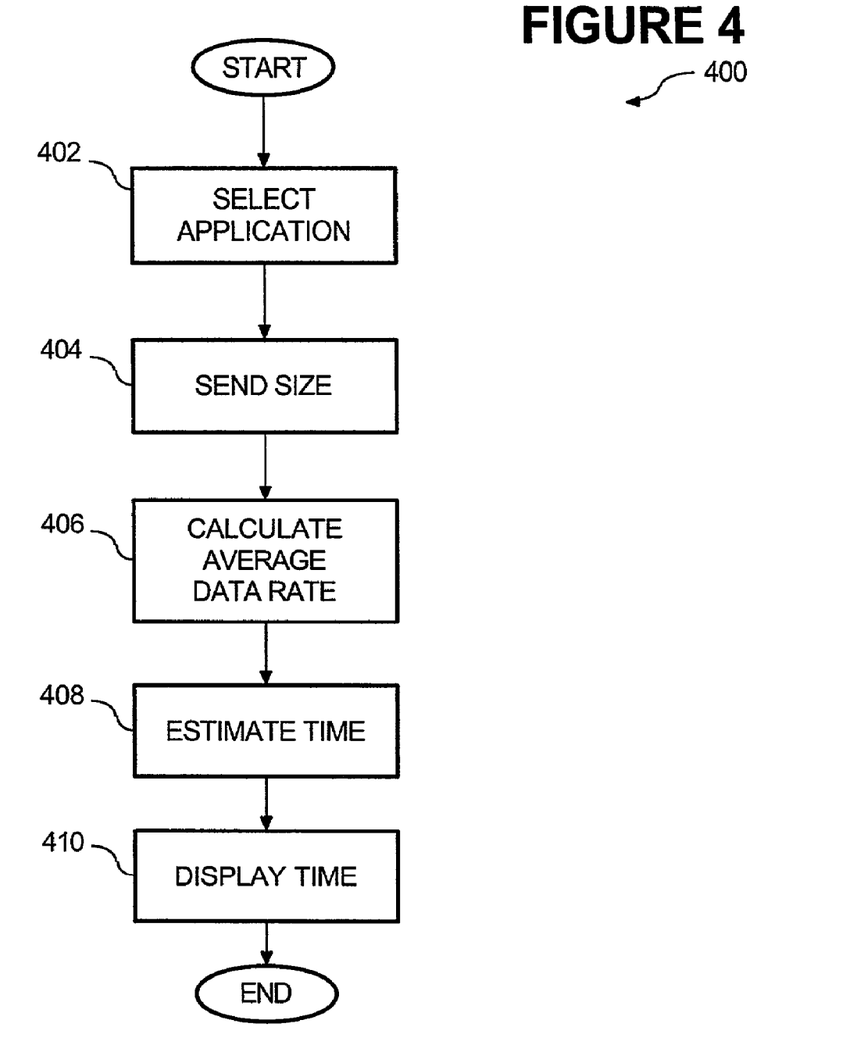
FIG. 4 is a flowchart of an operational sequence performed by a wireless device for an estimation and display of a length of time required to download a selected application program onto the wireless device based on the series of calculated data transfer rates in accordance with an exemplary embodiment of the present invention.

FIG. 4 shows a sequence 400 to illustrate the operation of a wireless device 222 using the calculated data transfer rates (as discussed in reference to FIG. 3 and FIG. 5(a)) to estimate a length of time required to download an application program 206 to the wireless device 222.

In step 402, the sequence begins at a point in time where the wireless device 222 is operated to select an application program 206 to be downloaded (step 402 corresponds to step 310 in FIG. 3).

In step 404, the server 204 sends the wireless device 222 information representing a size of the selected application program 206. The size of the selected application program 206 may be represented in megabits, or any other metric.

In step 406, the wireless device 222 receives the information representing the size of the selected application program 206. In response, if there is more than one calculated data transfer rate (as discussed in connection with FIG. 3 and FIG. 5a), the wireless device 222 proceeds to calculate an "average" data transfer rate for the wireless device 222 based on the series of data transfer rate calculations previously accomplished. The "average" data transfer rate may be calculated in various manners, including without limitation, a straight average, a weighted average, a moving average, or a moving weighted average using some or all of the data transfer rates previously calculated. There is a distinct advantage to weighting the data transfer rates over time. For example, if a wireless device 222 is being operated in a moving vehicle, the wireless device 222 may be experiencing varying S/N ratios. The data transfer rates calculated closer in time to the downloading of the selected application program 206 provide a more accurate "picture" of the S/N ratio conditions unique to the wireless device 222.

In step 408, the length of time to download is estimated by the wireless device 222 by dividing the size of the selected application program 206 with the average data transfer rates.

Figure 5B:
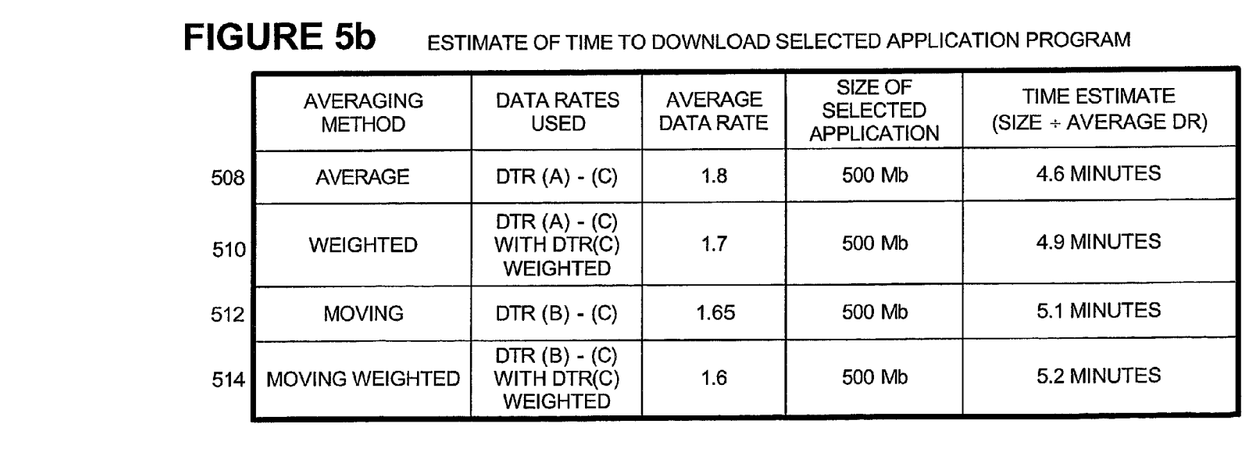
FIG. 5b shows a table of exemplary calculations by the wireless device of the corresponding estimates of time to download the selected application program in accordance with an exemplary embodiment of the present invention.

FIG. 5b shows a table of exemplary calculations done by a wireless device 222 to reach different averages of the data transfer rates (step 406) which are then used to estimate the time to download the application program 206 (step 408). Referring to the table at FIG. 5b, the three data transfer rates may be used to calculate different averages. The exemplary, non-exclusive averaging methods illustrated in FIG. 5b comprise: a straight average (Row 508), a weighted average (Row 510), a moving average (Row 512) and a moving, weighted average (Row 514). Each averaging method (step 406), and the resulting time estimate (step 408), are discussed in turn.

Row 508 of FIG. 5b illustrates a time estimate based on a straight averaging of DTRs (A) through (C). In Row 508, the three data transfer rates (of 2.1, 1.8 and 1.5 Megabits/second, respectively), when averaged, result in an overall (average) data transfer rate of 1.8 Megabits/second. The size of the exemplary selected application program 206 is 500 Megabits. The time estimate to download is the size of the program (500 Mb) divided by the average data rate (1.8), or 4.6 minutes.

Row 510 of FIG. 5b illustrates a time estimate based on a weighted averaging of DTRs (A) through (C). In Row 510, the three data transfer rates (of 2.1, 1.8 and 1.5 Megabits/second, respectively) are averaged with DTR(C), calculated later in time, given more weight. The resulting weighted average data transfer rate is 1.7 Megabits/second. The size of the exemplary selected application program 206 is 500 Megabits. The time estimate to download is the size of the program (500 Mb) divided by the weighted average data rate (1.7), or 4.9 minutes.

Row 512 of FIG. 5b illustrates a time estimate based on a moving averaging of DTRs (B) through (C). In Row 512, only the data rates later in time (DTR(B) and (C)) with data transfer rates (of 1.8 and 1.5 Megabits/second, respectively) are averaged. The resulting moving average data transfer rate is 1.65 Megabits/second. The size of the exemplary selected application program 206 is 500 Megabits. The time estimate to download is the size of the program (500 Mb) divided by the weighted average data rate (1.65), or 5.1 minutes.

In Row 514, the three data transfer rates are used to calculate a moving weighted average. This method takes into account only those data transfer rate calculations occurring within a specified period of time immediately preceding the actual download of the selected application program 206, and places more weight on the data transfer rate calculations later in time. For purposes of the present example, DTRs (B) through (C) are averaged, placing more weight on DTR (C). The resulting moving weighted average data transfer rate is 1.6 Megabits/second. The size of the exemplary selected application program 206 is 500 Megabits. The time estimate to download is the size of the program (500 Mb) divided by the weighted average data rate (1.6), or 5.2 minutes.

The exemplary time estimates calculated in FIG. 5b demonstrate that the data transfer rates for communications to the wireless device 222 in this example are decreasing over time. This may indicate that the wireless device 222 is experiencing dynamic SIN ratio conditions. For example, the wireless device 222 may be moving into an area with a high degree of electromagnetic interference. Alternatively, the wireless device 222 may be moving to an area where the signals from the BTS 218 are blocked (such as behind a mountain). Regardless of the reason for the changes in the S/N ratio conditions, the data transfer rates calculated later in time may be more accurate, and provide a better estimate of the time to download the selected application program 206.

Referring back to FIG. 4, in Step 410, after the wireless device 222 estimates the time to download a selected application program 206 under any of the exemplary methods described above, the wireless device 222 is programmed to automatically display the estimated time to the user. Step 410 in FIG. 4 corresponds to Step 312 in FIG. 3. Sequence 400 ends when the time display has been completed by the wireless device 222.

Alternative Embodiments Where Server Calculates Data Transfer Rates

The server 204 (or conceivably any other network 200 component capable of communicating with the wireless devices 205) may additionally, or alternatively calculate data transfer rates. In one embodiment, the server 204 calculates data transfer rates based on the length of time between sending a data file 208 to a wireless device 222 and receiving notification from the wireless device 222 that the data file 208 was received.

In this embodiment, the wireless device 222 is programmed to notify the server 204 immediately upon completion of the downloading of each of the data files 208 onto the wireless device 222. In response, the server 204 divides the size of the data file 208 by the corresponding length of time between the server 204 sending the data file 208 to the wireless device 222, and the wireless device 222 notifying the server 204 of the completed download.

Alternatively, the wireless device 222 may notify the server 204 of the total length of time required to download each data file 208 onto the wireless device 222.

Only one data transfer rate needs to be calculated by the server 204 prior to the server 204 estimating the time to download any selected application program 206. However, if more than one data transfer rate is calculated, the server 204 may calculate an average data transfer rate and estimate the time to download the selected application program 206 by using one or more of the same methods illustrated in FIG. 5b. The server 204 sends the estimate to the wireless device 222 to be displayed to the user.

Alternatively, the server 204 calculates each data transfer rate, and sends the calculations to the wireless device 222. The wireless device 222 uses the data transfer rates to calculate an average data transfer rate and estimation as illustrated in FIG. 5b.

Alternative Embodiment Where Server Initiates Communication

As another alternative embodiment, the server 204 (or any other network 200 component), as opposed to the wireless device 222, initiates communications. This "pushed" contact with the wireless device 222 may be initiated for reasons including, without limitation, to provide the user with important information, or as an attempt to get the user to purchase one or more application programs 206 to be downloaded.

In this embodiment, the server 204 sends one or more data files 208 over the network 200 to be broadcast to the wireless device 222. The data files 208 contain information regarding one or more application programs 206 available for potential download onto the wireless device 222. During this process, the server 204 and/or the wireless device 222 calculates the data transfer rates and the corresponding time estimate for download using any one or more of the methods discussed above. The wireless device 222 displays the estimated length of time to the user.

Signal Bearing Medium/Circuitry

As discussed above, the invention concerns the individual estimating and display of a length of time to download an application program over a wireless network to a remote module, such as a wireless device, based on calculated data transfer rates.

In the context of FIGS. 1–2, these methods may be implemented, for example, by operating portion(s) of the network 200 to execute a sequence of machine-readable instructions. These instructions may reside in various types of signal-bearing media. This signal-bearing media may comprise, for example, RAM (not shown) accessible by, or residing within, the components of the network 200. Alternatively, the instructions may be contained in another signal-bearing media, such as a magnetic data storage diskette (not shown). Whether contained in RAM, a diskette, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), or an optical storage device (e.g. CD-ROM, WORM, DVD, digital optical tape).

As for the wireless devices 205, the methods discussed herein may be implemented with any type of circuitry, microprocessors, or other types of hardware in the wireless devices 205.

OTHER EMBODIMENTS

While the foregoing disclosure shows illustrative embodiments of the invention, it will be apparent to those skilled in the art that various changes and modifications can be made herein without departing from the scope of the invention as defined by the appended claims. For example, the foregoing describes systems and methods to download an application, whereas it will be recognized by those skilled in the art that the present invention includes the downloading of any file type, including documents, data, and voice. Furthermore, although elements of the invention may be described or claimed in the singular, the plural is contemplated unless limitation to the singular is explicitly stated.

What is claimed is:

1. A method for estimating a length of time required to download one or more application programs onto a wireless device over a wireless network, said method comprising operations of:
the wireless device receiving one or more data files from a server, each data file of the one or more data files containing information representing a size of the data file, said data files including information about the one or more application programs available for downloading onto the wireless device and a size of the one or more application programs available for downloading onto the wireless device;
during the receiving, the server using the size of each of the one or more data files to measure one or more data transfer rates for the receiving operation;
receiving user input of one or more application programs to download;
at least one of the server and wireless device:
utilizing the one or more measured data transfer rates and the size of the selected one or more application programs to estimate a length of time required to download the one or more application programs onto the wireless device; and
the wireless device providing a quantitative output of the estimated time.

2. The method of claim 1, further comprising:
the wireless device sending one or more requests to the server to obtain the data files from the server.

3. The method of claim 1, wherein the information about the one or more application programs describes the one or more application programs available for download onto the wireless device.

4. The method of claim 1, further comprising:
the server transmitting the application programs for download onto the wireless device in response to operation of the wireless device to purchase the one or more application programs.

5. The method of claim 1, the measuring operation comprising operations of:
the wireless device notifying the server immediately upon completion of the downloading of each of the one or more data files; and
in response, the server dividing a size of each of the one or more data files by a length of time between the server sending each data file to the wireless device, and the wireless device notifying the server of the completed download.

6. The method of claim 1, the utilizing operation comprising operations of:
calculating an average data transfer rate by averaging each measured data transfer rate; and
dividing the size of each of the one or more selected application programs by the average data transfer rate.

7. The method of claim 1, the utilizing operation comprising operations of:
calculating a weighted data transfer rate by averaging each measured data transfer rate, giving more weight to the data transfer rates calculated closer in time to the operation of the wireless device to select the one or more application programs for download; and
dividing the size of each of the one or more selected application programs by the weighted data transfer rate.

8. The method of claim 1, the utilizing operation comprising operations of:
calculating a moving data transfer rate by averaging each measured data transfer rates for a period of time immediately preceding the operation of the wireless device to select the one or more application programs for download; and
dividing the size of each of the one or more selected application programs by the moving data transfer rate.

9. The method of claim 1, the utilizing operation comprising operations of:
calculating a moving weighted data transfer rate by averaging each measured data transfer rate for a period of time immediately preceding the operation of the wireless device to select the one or more application programs for download and giving more weight to the calculated data transfer rates closer in time to the operation of the wireless device to select the one or more application programs for download; and
dividing the size of each of the one or more selected application programs by the moving weighted data transfer rate.

10. An information exchange system comprising:
one or more wireless devices programmed to perform operations over a wireless network comprising:
receiving one or more data files from a server, each data file of the one or more data files containing information representing a size of the data file, said data files including information about one or more application programs available for downloading onto the wireless device and a size of the one or more application programs available for downloading onto the wireless device;
notifying the server immediately upon completion of the downloading of each of the one or more data files sent from the server;
receiving user input of one or more selected application programs to download;
receiving an estimate of time to download the selected application programs from the server;
providing an output of the estimated time;
one or more servers, each server programmed to perform operations over a wireless network comprising:
after being notified by the one or more wireless devices, measuring, at the one or more servers, one or more data transfer rates for each of the one or more data files using the size of each of the one or more data files;
utilizing the one or more measured data transfer rates and the size of the selected one or more application programs to estimate a length of time required to download the one or more application programs onto the wireless device; and
sending the time estimate to the wireless device;
wherein said time estimate is quantitative.

11. The system of claim 10, wherein the one or more wireless devices programmed to perform operations over the network further comprises the operation of:
the wireless device sending one or more requests to the server to obtain the data files from the server.

12. The system of claim 10, wherein the one or more wireless devices programmed to perform operations over the network further comprises the operation of:
the server initiating a transmission of the data files to the wireless device.

13. The system of claim 10, wherein the operation of the server calculating one or more data transfer rates further comprises:
the server dividing the size of each of the one or more data files by a length of time between the server sending each data file to the wireless device, and the wireless device notifying the server of the completed download.

14. An information exchange system comprising:
one or more wireless devices programmed to perform operations over a wireless network comprising:
receiving one or more data files from a server, each data file of the one or more data files containing information representing a size of the data file, said data files including information about one or more application programs available for downloading onto the wireless device and a size of the one or more application programs available for downloading onto the wireless device;
during the receiving, measuring, at the server, one or more data transfer rates for the receiving operation for each of the one or more data files using the size of each of the one or more data files;
receiving user input of one or more application programs to download;
utilizing the one or more measured data transfer rates and the size of the selected one or more application programs to estimate a length of time required to download the one or more application programs onto the wireless device;
providing an output of the estimated time; and
one or more servers, each server programmed to perform operations over a wireless network, the operations comprising:
sending the one or more data files to the wireless device;
wherein said estimated time is quantitative.

15. The system of claim 14, wherein the one or more wireless devices programmed to perform operations over a wireless network further comprises operation of:
the wireless device sending one or more data requests to the server to obtain the data files from the server.

16. The system of claim 14, wherein the one or more wireless devices programmed to perform operations over a wireless network further comprises operation of:
the server initiating a transmission of the data files to the wireless device.

17. An information exchange system comprising:
wireless device means for performing operations comprising:
receiving one or more data files from a server, each data file of the one or more data files containing information representing a size of the data file, said data files including information about one or more application programs available for downloading onto the wireless device and a size of the one or more application programs available for downloading onto the wireless device;
during the receiving, measuring, at the server, one or more data transfer rates for the receiving operation for each of the one or more data files using the size of each of the one or more data files;
receiving user input of one or more application programs to download;
utilizing the one or more measured data transfer rates and the size of the selected one or more application programs to estimate a length of time required to download the one or more application programs onto the wireless device;
providing a quantitative output of the estimated time; and server means for performing operations comprising:
sending the one or more data files to the wireless device.

18. A method for estimating a length of time required to download a download file onto a wireless device, comprising the steps of:
receiving, at the wireless device, one or more data files, each containing an associated size field, wherein each associated size field indicates the size of the data file to which the size field is associated, the one or more data files including information about the download file and the size of the download file;
measuring, at a server, a length of time required to receive, at the wireless device, each of the one or more data files sent from the server and for the wireless device to notify the server of the receipt of each of the one or more data files;
calculating, at the server, a data transfer rate for each of the one or more data files using the size of each of the one or more data files and the measured length of time;
calculating, at the server, a combined data transfer rate using the data transfer rate of each of the one or more data files;
estimating, at the wireless device, the length of time to download the download file using the combined data transfer rate and the received size of the download file; and
outputting, on the wireless device, quantitative indication of the length of time.

19. The method of claim 18, wherein the step of calculating the combined data transfer rate is an averaged based on the calculated data transfer rates of the one or more data files.

20. The method of claim 18, wherein the step of calculating the combined data transfer rate is a time weighted calculation based on when the one or more data files were received.

21. A computer-readable medium containing computer-executable instructions for estimating the length of time required to download a download file, that when executed comprise the steps of:
receiving, at a wireless device, one or more data files sent from a server, each data file containing an associated size field, wherein each associated size field indicates the size of the data file to which the size field is associated, the one or more data files including information about the download file and the size of the download file;
measuring, at a server, a length of time required for the wireless device to receive each of the one or more data files from the server and for the wireless device to notify the server of the receipt of each of the one or more data files;
calculating, at the server, a data transfer rate for each of the one or more data files using the size of each of the one or more data files and the measured length of time;
calculating, at the server, a combined data transfer rate using the data transfer rate of each of the one or more data files;

estimating, by the wireless device, a length of time to download the download file using the combined data transfer rate and the received size of the download file; and displaying, at the wireless device, a quantitative indication of the length of time.

22. A system for estimating the length of time required to download a download file, comprising:

means for receiving, at a wireless device, one or more data files, each containing an associated size field, wherein each associated size field indicates the size of the data file to which the size field is associated, the one or more data files including information about the download file and the size of the download file;

means for measuring, at a server, a length of time required to receive each of the one or more data files and for the wireless device to notify the server of the receipt of each of the one or more data files;

means for calculating, at the server, a data transfer rate for each of the one or more data files using the size of each of the one or more data files and the measured length of time;

means for calculating, at the server, a combined data transfer rate using the data transfer rate of each of the one or more data files; and means for estimating, at the wireless device, the length of time to download the download file using the combined data transfer rate and the received size of the download file.

* * * * *